Dec. 31, 1968

C. A. ELLIS 3,418,715

DENTAL HANDPIECE DRIVE MECHANISM AND DENTAL TOOL HOLDER

Filed Sept. 3, 1957

INVENTOR.
CHARLES A. ELLIS
BY
ATTORNEY

# United States Patent Office 3,418,715
Patented Dec. 31, 1968

1

3,418,715
DENTAL HANDPIECE DRIVE MECHANISM AND DENTAL TOOL HOLDER
Charles A. Ellis, Hamden, Conn., assignor to Ritter Pfaudler Corporation, a corporation of New York
Filed Sept. 3, 1957, Ser. No. 681,683
10 Claims. (Cl. 32—26)

This invention relates to dental apparatus and more particularly to a unitary or capsule construction for the drive mechanism and dental tool holder of a dental handpiece of the fluid turbine type.

In one type of dental handpiece used in present day practice, particularly where high speeds are desired, the dental tool, such as a drill or burr, is driven by a turbine of the type utilizing a pressurized fluid such as compressed air. In order to eliminate the need for a complex gearing or other connecting parts, the dental tool is preferably secured in a removable manner directly to turbine rotor for rotation therewith. Thus, the dental tool and turbine rotor may be driven at relatively high speeds by means of the compressed air so as to provide the dentist with a handpiece for rapid removal of tooth material in a substantially painless manner.

As a result of the relatively high speed at which the turbine is operated and the shock loading frequently applied to the dental tool during the drilling or grinding operation, drive mechanisms of this type are readily susceptible to breakdown and consequently required more frequent maintenance than conventional low speed, belt driven type of dental handpiece. This, of course, means that there would be frequent occasions during which the dental handpiece would be of no use to the dentist as lengthy periods are generally required for maintenance and repair. The dentist therefore must consequently either purchase spare handpieces which can be used while waiting for repairs which of course means additional expense or compromise by utilizing the available, low speed belt driven type of handpiece. Furthermore, it is well known that previous drive mechanisms of the fluid turbine type employed a substantial number of precision parts such as bearings, sleeves, dental tool chucks and the like, all of which must be carefully and accurately assembled. Consequently, the dismantling and repair of the mechanism is at best an expensive and time consuming operation adding to the period required for repair.

Accordingly, a primary object of this invention is to provide a new and novel construction for the driving mechanism of a dental handpiece of the fluid turbine type.

Another object of this invention is to provide a new and novel drive mechanism for the dental tool in a fluid turbine type of dental handpiece which permits both the drive mechanism and dental tool holder to be quickly and simply removed as a unit.

A further object of this invention is to provide a new and novel capsule construction for the fluid turbine drive mechanism and dental tool holder of a dental handpiece which is arranged to be received with the handpiece in communication with a source of pressurized fluid and securely held therein in accurate alignment by easily removable means.

A still further object of this invention is to provide a new and novel dental tool holder for a dental handpiece which permits a dental tool to be securely positioned or replaced in the handpiece by an easily releasable clamping construction.

Still another object of this invention is to provide a new and improved capsule construction for the drive mechanism of a dental handpiece which is simple in construction so as to contain a minimum of parts, economical to manufacture and which may be quickly exchanged in a rapid and simple manner with a similar capsule in event of mechanical breakdown so as to permit substantially continuous use of the handpiece.

This invention further contemplates a provision for a new and improved construction for the turbine drive mechanism and dental tool holder of a dental handpiece in which the various components of the capsule are arranged in a compact unit for easy insertion and removal from an appropriately formed well in the handpiece housing and for simple disassembly and assembly of the components themselves in the unit.

Other objects and advantages of this invention will be particularly set forth in the claims and will be apparent from the following description, when taken in connection with the accompanying drawings, in which:

Figure 1:
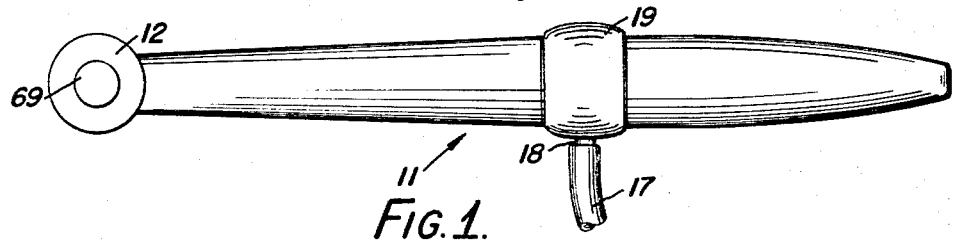
FIG. 1 is a top view of a dental handpiece of the fluid turbine type which incorporates the invention.

Referring now to FIG. 1, there is shown a dental handpiece which incorporates the invention. This dental handpiece is of the fluid turbine type and comprises a casing, designated generally by the numeral 11, at the forward end of which is securely fixed by any suitable means such as brazing, a head 12. The head 12 is provided with an axial bore or well 13 having an open end 15 (FIG. 4) which accommodates a combined "capsule" turbine drive mechanism and dental tool holder, designated generally by the numeral 14 (FIG. 6) and constructed in accordance with the invention. As will be explained hereinafter, a dental tool such as a drill or burr 16 may be positioned as shown in dotted lines in FIG. 2 within the head 12 so that the handpiece may be utilized in a well known manner by the dentist.

Any suitable means may be provided to feed the pressurized fluid to the turbine drive mechanism 14 and in the illustrated embodiment, a flexible pressure line 17, connected at one end to a source of pressurized fluid such as compressed air (not shown), is connected at its other end to a fitting 18 on a fluid connector 19. The conductor 19 is preferably rotatably mounted on a portion of reduced diameter 21 of a forward casing section 22 to which a rear casing section 24 is threadedly secured as at 23. The construction of this portion of the handpiece is shown and described in my copending application Ser. No. 662,753, filed May 31, 1957, entitled, "Dental Handpiece."

The connector 19 is provided with an annular groove 26 which communicates with the fitting 18 and which in any position of rotation overlies a radial port 27 in the forward casing section 22. The port 27 in turn communicates with a longitudinally extending air inlet passage 28 in casing section 22. The passage 28 is closed at the rear by means such as a plug 29 and communicates at its open end with the turbine drive mechanism 14. Thus, air flowing in the pressure line 17 travels serially through fitting 18, connector groove 26, port 27, passage 28 into the drive mechanism 14 from which it is subsequently discharged into a second longitudinally extending passage 31 in casing section 22. It will be noted that outlet passage 31 is of larger diameter than passage 28 to accommodate the expanded exhaust air which is subsequently vented to the atmosphere through a threaded bore 32 in the rear casing section 24, a central bore 33 in an axially movable externally threaded counterweight 34, and an outlet port 36 in the rear end of casing section 24.

It should be understood that the above described arrangement for supplying pressurized air to the turbine drive mechanism is illustrative only and the invention is not necessarily limited thereto.

It can be seen that the individual mounting of the various parts of the turbine drive mechanism 14 within the head 12 becomes a meticulous and precise operation requiring a high degree of skill, particularly in dental handpieces of the type illustrated which are to be driven at relatively high speeds. Similarly, disassembly of the components for repair such as would follow in the event of a mechanical breakdown is an expensive and time consuming operation. Through the novel construction of this invention, there has been provided a unitary construction for a turbine drive mechanism including a dental tool holder which may be easily located and secured in operating position in the dental handpiece head 12 and upon the necessity of removal may be quickly and easily withdrawn.

Figure 4:
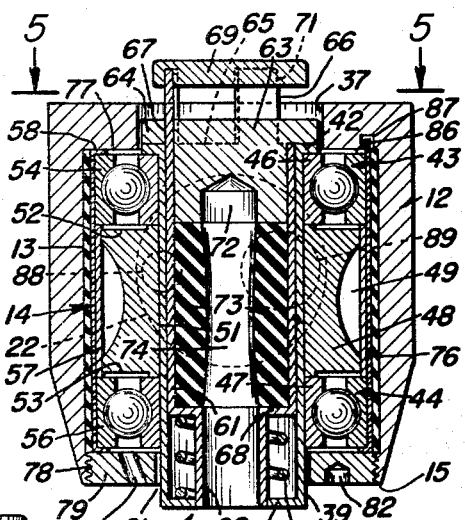
FIG. 4 is an enlarged sectional view taken substantially along line 4—4 of FIG. 3 in the direction of the arrows.

As specifically illustrative of the invention and as shown best in FIG. 4, the well or bore 13 in the head 12 is preferably of cylindrical shape and contains a portion of reduced diameter 37. The turbine drive mechanism or capsule 14, which is arranged to be received within the well 13 in a manner to be explained hereinafter, includes a centrally arranged spindle or sleeve 39, flanged at each end at 41, 42 as shown in FIG. 4. A dental tool holder, designated generally by the numeral 38, is positioned within the spindle 39 and is arranged to releasably support the dental tool 16 in a manner to be explained hereinafter. It should be understood that any type of dental tool holder 38 may be carried by the spindle 39 such as a tapered chuck or the like but the illustrated tool holder 38 is of such novel construction as to be particularly adapted for use in the capsule construction of this invention.

In order to rotatably support the spindle 39, bearing means, such as a pair of bearings, designated generally by the numerals 43, 44 are fixed in spaced relationship on the spindle with their inner races 46, 47 respectively, fixedly mounted thereon in any suitable manner such as press fitting or the like. The inner race 46 of bearing 43 is preferably positioned as shown in contact with the spindle flange 42.

Prior to installation of the bearing 44, a turbine rotor 48 having a pluarlity of radially spaced blades 49 and a central bore 51 is securely positioned on the spindle 39 in any suitable manner for rotation therewith. The rotor 48 is thus arranged to lie between the bearings 43, 44 and is provided with ends cut away at 52, 53 so as to clear the outer races 54, 56 of bearings 43, 44 respectively.

Means have also been provided to maintain the bearings 43, 44 in the spaced relationship of FIG. 4. More specifically, a spacer sleeve 57 is located in peripheral relationship with the rotor 48 and in endwise contact with the outer races 54, 56 of the bearings so that the spacer sleeve is held securely therebetween. The diameter of the spacer sleeve 57 is sufficient to permit the turbine rotor 48 to move freely therein while providing some sealing engagement with the turbine end portions.

In order to clamp the bearings in the assembled relationship of FIG. 4 and retain the spacer sleeve 57, rotor 48 and spindle 39 in the unitary or capsule construction, a supporting member, preferably a cylindrical sleeve or shell 58, is positioned in encircling relationship with the aforementioned parts and in flushwise engagement with the outer faces of the outer bearing races 54, 56. The sleeve 58 is also preferably positioned as shown in flushwise engagement with the spacer sleeve 57.

Figure 6:
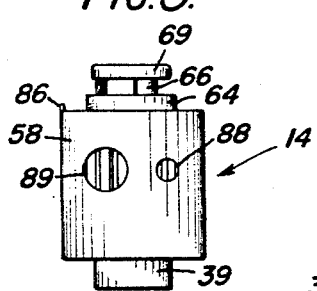
FIG. 6 is an elevational view of the unitary drive mechanism and dental tool holder removed from its associated dental handpieces.

The sleeve 58 is spun over or otherwise bent over at each of its ends so as to assist in retaining the outer races 54, 56 of the bearings against the circular ends of spacer sleeve 57 and thus form a unitary or capsule construction for the turbine drive mechanism 14. With this construction, therefore, a compact and unitary turbine drive mechanism is formed which may be assembled independently of the handpiece. FIG. 6 shows this assembly 14 removed from the handpiece.

As previously explained, the turbine drive mechanism 14 may be provided with any suitable type of dental tool holder so that the dental tool 16 may be rotated together with the turbine rotor 48. However, this invention is particularly adapted for the use of a novel type of dental tool holder 38 which is arranged to releasably support the dental tool 16.

As shown in FIG. 4, an axially movable sleeve 61 having a portion of reduced diameter 62 at one end is positioned coaxially within the spindle 39 for axial movement relative thereto. In order to permit the tool holder sleeve 61 to rotate with spindle 39 and still slide axially, a cap or head 63 having a peripheral flange 64 along the upper edge thereof is seated within the upper end of the spindle 39 and sleeve 61 with the head flange 64 suitably secured by means such as brazing or the like to the spindle flange 42.

Figure 5:
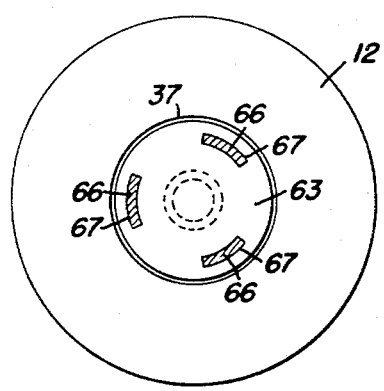
FIG. 5 is a sectional view taken substantially along line 5—5 of FIG. 4 in the direction of the arrows.

In order to secure the tool holder sleeve 61 to the spindle 39 so that these parts may be rotated together and still permit relative axial movement, the holder sleeve 61 is cut away to provide a plurality of radially spaced, vertically extending projections 66 which extend through corresponding arcuate slots 67 in the head 63 as shown best in FIG. 5. These projections 66 are of sufficient length so that the dental tool holder sleeve 61 may be moved reciprocally in an axial direction against the biasing action of a loading spring 65 suitably positioned between the spindle flange 41 and a shoulder 68 on the holder sleeve 61. The upward movement of sleeve 61 is therefore limited by the head flange 64 and its downward movement by a button 69 containing a plurality of recesses 71 for receiving in fixed relationship the upper end of the sleeve projections 66.

In order to support the dental tool 16 within the tool holder 38, the head 63 is provided with a central recess 72 and an elongated sleeve or collar of resilient material 73 having a central bore 74 is positioned within and supported by the sleeve 61 between the head 63 and sleeve shoulder 68.

Under the biasing action of the loading spring 65, the sleeve 61 is moved upwardly until the shoulder 65 on the sleeve contacts the head flange 64 to limit its upward movement and in this position the collar or clamping member 73 is compressed slightly so as to bulge inwardly as shown in FIG. 4.

In the operation of the dental tool holder 38, the button 69 is moved manually downward against the loading action of the spring 65 so as to permit the collar 73 to elongate and provide a normally cylindrical cross-section in the bore 74.

Figure 2:
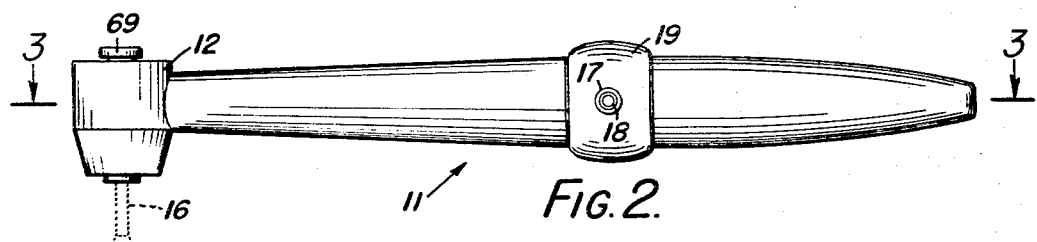
FIG. 2 is a side view of the handpiece of FIG. 1.
Figure 3:
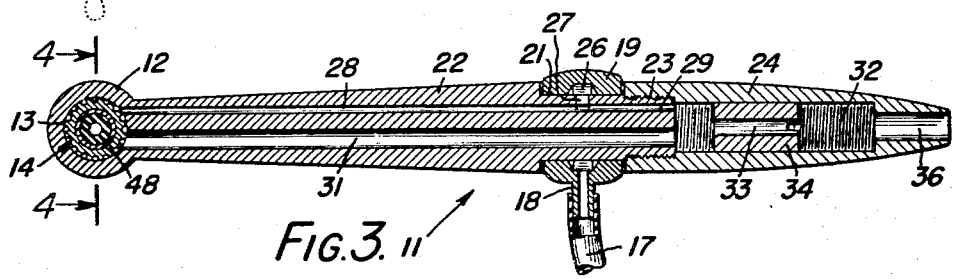
FIG. 3 is a sectional view taken substantially along line 3—3 of FIG. 2 in the direction of the arrows.

The shank of the dental tool 16 may then be inserted in the conventional manner in the sleeve bore 62, collar bore 74, and cap recess 72 so that when the button 69 is released the spring 65 once again compresses the sleeve 73 to constrict the collar bore 74 so that the collar will clamp the shank of tool 16 holding it securely in the operating position of FIG. 2.

As has been previously explained, the turbine drive mechanism 14 including the dental tool holder 38 is arranged to be quickly and simply inserted or withdrawn from the well 13 in the dental handpiece head 12. As shown in FIG. 4, the well 13 is provided with a coating or liner 76 of resilient material and has an inner diameter corresponding generally to the outer diameter of the supporting sleeve 58.

The capsule 14 is easily inserted within the well 13 through opening 15 into the position of FIG. 4 so that the sleeve 58 is located in snug fitting engagement with the resilient liner 76 and the upper end of the sleeve 58 engages a well shoulder 77. It will be noted that when the capsule is in the position of FIG. 4, the well bore portion 37 is of such diameter as to be spaced from the head flange 64 as the head 63 and its associated parts will be rotating relative to the handpiece head 12.

In order to securely position the turbine drive mechanism 14 within the head 12, the head opening 15 is threaded at 78 so that a retaining cap 79 having a central bore 81 may be threadedly positioned in the opening 15 of the well 13 in engagement with the lower end of the supporting sleeve 58. Means such a plurality of recesses 82 are provided in the cap 79 for accommodating a spanner wrench or the like in order to threadedly attach or remove the cap on head 12. It can be seen that the lower end of spindle 39 extends through the cap bore 81 in the assembled position so as to permit easy insertion of the dental tool 16. The cap 79 is also provided with at least one diagonal passage 83 as shown in FIG. 4 through which leakage air from the turbine rotor 28 may pass. The passage 83 is arranged to direct this air toward the dental tool 16 for cooling purpose.

Radial alignment of the drive mechanism 14 in the well bore 13 is obtained by any suitable means such as a tab or projection 86 on the upper end of the supporting sleeve 58 (FIGS. 4, 6) which is received with a recess 87 in the well bore shoulder 77 when the mechanism 14 is properly seated as shown in FIG. 4.

In order that the compressed air fed to the turbine mechanism 14 can move through the supporting sleeve 58, the sleeve is provided with a pair of openings 88, 89 (FIG. 6) which, when the mechanism 14 is properly seated and aligned in the well bore 13, are located in communication with the forward ends of casing passages 28, 31. Thus, compressed air traveling in inlet passage 28 is directed against the turbine rotor 48 and is subsequently ejected by the rotor into the outlet passage 31.

It can thus be seen that through the novel construction of the invention, the turbine drive mechanism 14 including the dental tool holder 38 may be assembled independently into a one-piece or unitary construction and inserted simply and easily within the dental handpiece head 12 in proper alignment and securely held therein by means of the easily removable cap 79. As a result of the unitary construction of the mechanism, they are relatively inexpensive to manufacture and spare units for a handpiece may be purchased at a relatively low cost so that in the event of mechanical breakdown the dentist need only remove cap 79 and replace the defective unit with a completely new mechanism. Thus, the defective parts may be repaired without haste and the operation of the dental handpiece is interrupted only momentarily. Furthermore, the capsule construction includes a novel dental tool holder which permits the dental tool to be securely and quickly positioned and exchanged in a rapid and simple manner. The dental tool is thus held securely in the proper operating position for effective use of the handpiece.

Figure 7:
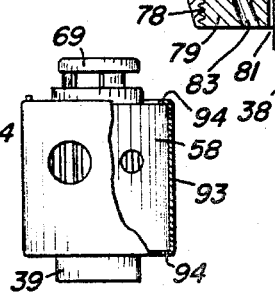
FIG. 7 is a partial sectional view of a portion of FIG. 4 showing an alternate way of sealing and damping vibrations and sound.

In the form of the invention shown in FIG. 4, the resilient vibration deadening material 76 is in the form of a liner or coating on the interior side walls of the well 13 of the head 12. In the form shown in FIG. 7, the resilient material 93 is carried by or coated on the sleeve 58 and carried over the spun over ends of the sleeve 58 as shown at 94. The resilient material 76 or the resilient material 93 provide sonic or ultrasonic dampening, reduce vibration and noise and act as a sealant for air.

While there has been shown an described the preferred forms of mechanisms of the invention, it will be apparent that various changes and modifications may be made therein, particularly in the form and relation of parts, without departing from the spirit of the invention as set forth in the appended claims.

I claim:

1. A dental tool holder for a dental handpiece comprising, in combination, a tubular outer sleeve, means for supporting said outer sleeve in a dental handpiece, an inner sleeve located in telescoping relationship with said outer sleeve and axially movable relative thereto, an elongated collar of resilient material supported on said inner sleeve, said collar having a central bore for freely accommodating the shank of a dental tool, a spring between said inner and outer sleeves normally compressing said collar whereby the wall of said central bore clampingly engages said dental tool shank, and means for moving said inner sleeve to compress said spring and release said collar from engagement with said tool shank.

2. A dental tool holder in accordance with claim 1 wherein said means for moving said inner sleeve includes a manually operable button operatively connected to said inner sleeve.

3. A dental tool holder for a dental handpiece comprising, in combination, a tubular outer sleeve, means for supporting said outer sleeve in a dental handpiece, a head freely secured to one end of said outer sleeve, a plurality of longitudinally extending slots in said head, a recess in said head, an inner sleeve positioned in telescoping relationship with said outer sleeve and slidably engageable with said head, said inner sleeve arranged to move axially relative to said outer sleeve, said inner sleeve provided with a constricted portion defining a shoulder, an elongated collar of resilient material supported within said inner sleeve between said shoulder and said head, said collar having a central bore in alignment with said head recess and constricted inner sleeve portion for freely accommodating the shank of a dental tool, a plurality of radially spaced tabs on said inner sleeve extending through the arcuate slots in said head a spring positioned between said inner and outer sleeve normally compressing said collar whereby the wall of said collar central bore clampingly engages said dental tool shank, a flange on said head engageable by said inner sleeve for limiting the compression of said collar, and a button secured to said extensions for moving said inner sleeve to compress said spring and release said collar from clamping engagement with said tool shank.

4. A combination dental tool holder and turbine drive mechanism for a dental handpiece of the fluid turbine type comprising, in combination, a rotatable spindle, bearing means adjacent each end of said spindle for rotatably supporting said spindle, a turbine rotor fixedly mounted on said spindle for rotation therewith, a support engageable in retaining relationship with said bearing means and arranged to be mounted in an associated handpiece, a clamping member composed of resilent material, means for supporting said clamping member interiorly of said spindle, means in said clamping member for freely accommodating the shank of a dental tool, means comprising a spring associated with said spindle for normally compressing said clamping member in clamping engagement with said dental tool shank and means for releasing said spring and clamping member compressing means.

5. A drive mechanism for a dental handpiece of the fluid turbine type comprising, in combination, a rotatable spindle, means for supporting a dental tool on said spindle, a bearing adjacent each of end of said spindle for rotatably supporting said spindle, a turbine rotor fixedly mounted on said spindle between said bearings, an annular spacer positioned in engagement and in spacing relationship with the fixed portions of said bearings, and a substantially cylindrical supporting shell member enclosing and engaging the fixed portions of said bearings in retaining relationship, said supporting shell member being arranged to be mounted in an associated handpiece so as to operatively position said dental tool in said handpiece.

6. A dental tool holder in accordance with claim 5 wherein the adjacent edges of said spacer and said supporting shell member engage the opposite side faces of the fixed portion of said bearings to retain said bearings in a fixed relationship.

7. A dental handpiece comprising, in combination, an elongated casing adapted to fit in the hand of the user, a head at one end of said casing having a bore the axis of which extends at an angle to the long direction of the handle, a unitary capsule comprising a cylindrical shell, a fluid driven turbine and bearings therefor mounted in said shell, said shell being adapted to fit within and be held in said bore and means communicating between said casing and the turbine and extending through the shell wall for supplying fluid under pressure to the turbine from said casing, whereby said unitary capsule can be easily removed and a like replaced in said bore.

8. A dental handpiece in accordance with claim 7 in which said head is threaded adjacent the margins of said bore and a nut is applied to said threads and applies pressure on the capsule to hold it assembled in said bore.

9. A dental handpiece comprising, in combination, an elongated casing adapted to fit in the hand of a user, a head at one end of said casing having a bore the axis of which extends at an angle to the long direction of the handle, a unitary capsule comprising a cylindrical shell, a fluid driven turbine and bearings therefore mounted in said shell, said shell having walls which confine the bearings and hold them in close fitting assembled relation, means communicating between said casing and the turbine and extending through the shell wall for supplying fluid under pressure to the turbine from said casing and means for orienting said shell in said bore radially of the axis thereof, whereby said unitary capsule can be easily removed and a like replaced in said bore.

10. A dental handpiece in accordance with claim 9 in which the bearings are of the ball bearing type having inner and outer races and in which the shell walls have portions extending inward to confine the outer races of the bearings endwise and a nut threaded into the end of said bore holds the shell, and the bearings and the turbine assembled therein in said head.

References Cited

UNITED STATES PATENTS

| | | | |
|---|---|---|---|
| 3,324,553 | 6/1967 | Borden | 32—27 |
| 2,180,993 | 11/1939 | Monnier | 253—2 |
| 2,468,946 | 5/1949 | Sherman | 279—102 |
| 2,283,314 | 5/1942 | Ckola | 15—24 |

LOUIS G. MANCENE, *Primary Examiner.*

ROBERT PESHOCK, *Assistant Examiner.*

U.S. Cl. X.R.

252—2